No. 861,674. PATENTED JULY 30, 1907.
N. PAVIA & G. CASALIS.
RAILWAY COUPLING.
APPLICATION FILED JAN. 31, 1906.
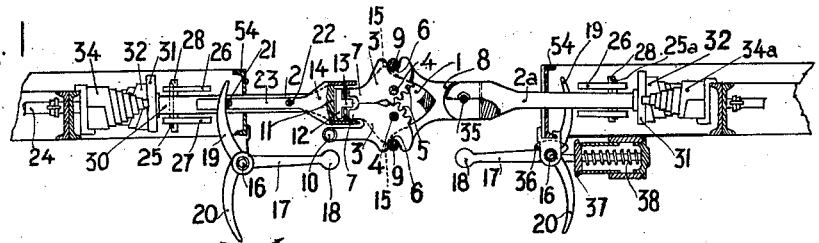
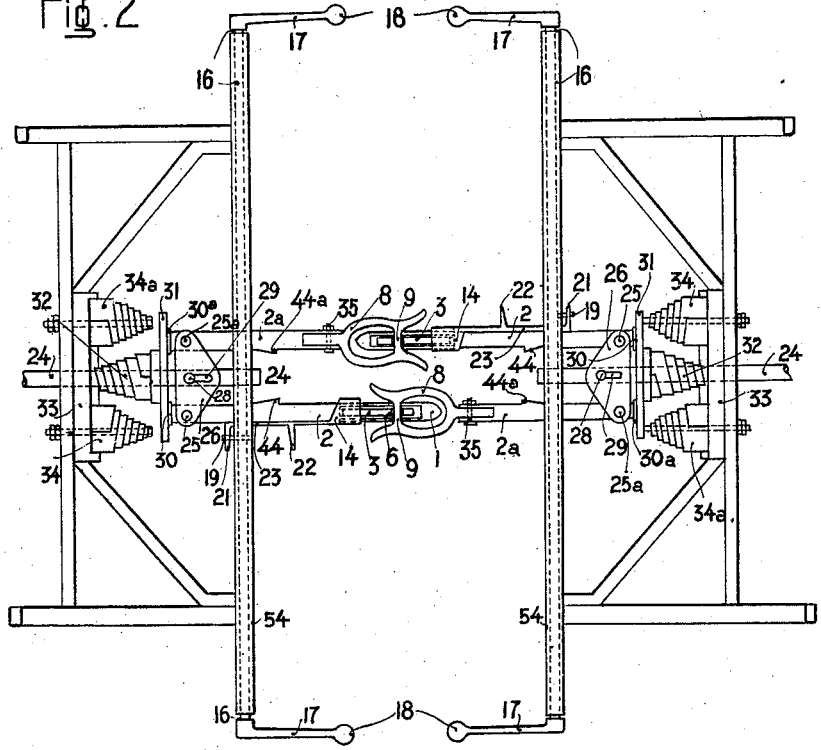
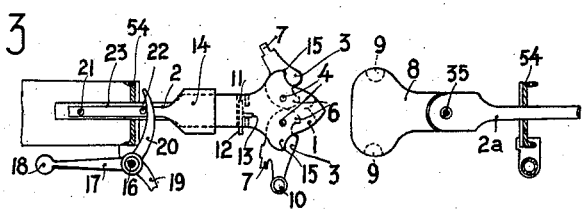
Witnesses:
Inventors:
Nicola Pavia and
Giacomo Casalis,
by H. N. Low attorney.

UNITED STATES PATENT OFFICE.

NICOLA PAVIA AND GIACOMO CASALIS, OF TURIN, ITALY.

RAILWAY-COUPLING.

No. 861,674.  Specification of Letters Patent.  Patented July 30, 1907.

Application filed January 31, 1906. Serial No. 298,805.

*To all whom it may concern:*

Be it known that we, NICOLA PAVIA, engineer, residing at Turin, Corso Siccardi 51, and GIACOMO CASALIS, residing at Turin, Corso Principe Oddone 23, both subjects of the King of Italy, have invented certain new and useful Improvements Relating to Railway-Couplings, of which the following is a full, clear, and exact specification.

The present invention has for its object a railway coupling, which in a simple manner permits of the coupling and uncoupling of two vehicles from the side.

Several constructional forms of the invention are illustrated in the accompanying drawing, in which:

Figure 1 shows the apparatus in side elevation partly in section, Fig. 2 is a corresponding plan view Fig. 3 is a plan view of a released coupling.

The coupling consists of a coupling hook and a coupling link which are provided in pairs on the ends of the vehicles 54 to be coupled. The coupling hook consists of a counter head 1, which is carried by a horizontal rod 2, the manner of attaching which to the vehicle will be described later. The head 1 of the hook presents a vertical slot of sufficient width for the reception of two rotatable hooks 3, the pivot bolts 4 of which run transversely of the head of the hook and which present teeth 5 engaging one in the other, so that the rotation of one hook 3 produces the simultaneous rotation of the other. The said hooks 3 likewise present a jaw 6 and a rear projection 7. The coupling link 8 presents the form of a funnel and is intended for the reception of the engaging head 1. The link 8 presents two transverse bars 9 the form of which corresponds to the jaw 6 of the rotatable hooks 3. The lower hook carries a weight 10 which causes it to assume the pendent position represented in Fig. 3, while the upper hook is raised in a corresponding manner owing to the teeth 5.

When the vehicles are brought together, the hook 1 engages the coupling link 8, the projections 9 of the latter cause the hooks 3 to rotate around the pivots 4 and the jaw 6 bears upon the bar 9, the projections 7 assuming a horizontal position as shown in Fig. 1. In the recess 11, which is vertical and is arranged in proximity to the base of the hook head 1, there is placed a movable sleeve locking member 12, which in the depressed position projects to a certain extent. This locking member presents a horizontal tooth 13 which when the lower hook 3 rotates comes against the projection 7 by which it is raised until its projecting part completely enters the recess 11. Upon the rod 2 there is mounted a displaceable sleeve 14 which may be held back by the lock 12, but which, when the lock is raised, may be pressed onto the projections 7 and seizes them so that the hooks 3 are held and prevented from rotation. In this manner the two portions of the coupling, and consequently the two vehicles are coupled together. In order to reinforce the connection the hook 1 is provided with projections 15 which bear against the bars 9. In order to press the sleeve forward into the position shown in Fig. 1, or to withdraw it into the position shown in Fig. 3, thereby effecting the coupling or uncoupling of the vehicles, a shaft 16, appropriately situated and extending through the whole width of the vehicle is provided; its two projecting ends carry a hand crank 17 provided with a weight 18. In proximity to the coupling hook this shaft is furnished with two arms 19, 20, which coöperate with two lugs 21, 22, carried by prolongation 23 of the sleeve 14. It will be seen from the position of the shaft 16 shown in Fig. 1 that the arm 19 is pressed by the action of the weight 18 against the lug 21 and the sleeve is pressed into the coupling position represented in Figs. 1 and 2. If the arm 17 is rotated out of this position in the direction indicated by the arrow through an angle of 180°, this bringing it into the position shown in Fig. 3, in which position it is pressed by means of the weight 18 of the arm 20 in the opposite direction against the lug 22, the sleeve is drawn back so that the two vehicles are uncoupled.

The manipulation to be effected in succession in coupling and uncoupling are as follows: If it is desired to couple two vehicles, the arms 17 are rotated into the position indicated in Fig. 1, whereby the sleeves 14 are pressed forward against the locking member 12. Now if the two vehicles are brought together it will be seen that the hooks 3 will be caused to rotate, and the projection of the lower hook lifts the locking member 12 so that this latter leaves a free path for the sleeve which is pressed forward by the arm 19 under the influence of the weight 18. In this manner the coupling of the two vehicles is effected. In order to uncouple them it is only necessary to bring the arms 17 into the position shown in Fig. 3 by rotation in the reverse direction, whereby the sleeve is drawn back.

The coupling parts described are mounted on the ends of the vehicles in pairs in such a manner that the end of each vehicle is provided with a hook and a coupling link as shown in Fig. 2.

The coupling parts described may be mounted without any special intermediate part upon the central draw bar 24 of the vehicle 54, but the requisite conditions of elasticity are improved by the employment of the connection shown in Fig. 2. The draw bars 2, 2ª, to which the displaceable coupling members, (that is to say both the hook and the link) are fitted, are connected by means of pins 25, 25ª with plates 26, 27 which constitute a kind of balance beam rotatably mounted on the vertical bolt 28 of the draw bar 24. The pivot pin 28 enters slots 29 formed in the said plates. The ends 30, 30ª of the draw bars 2, 2ª bear against a plate 31 running transversely of them and rigidly connected with one end of an evolute spring 32, the other end of which is fixed to a support 33 of the vehicle frame. To this support there are fixed by their wide bases or extremities two additional springs 34, 34ᵃ, similar to the first, their free ends being directed towards the back of the plate 31. When the train is started, the tractive force is transmitted through the bars 2, 2ᵃ, by means of the bolts 25, 25ᵃ, onto the plates 26, 27 and from the latter by means of the pin 28 onto the draw bar 24 and to the vehicle. In the alternating transmission of pressure the bars 2, 2ᵃ bear against the plate 31 which compresses the spring 32 to such an extent that the plate 31 comes into contact with the end of the springs 34, 34ᵃ, so that the pressure is transmitted to the vehicle by means of the three springs 32, 34, 34ᵃ. When finally these springs are sufficiently compressed, the other end of the slot 28 reaches the bolt 29 against which the plates 26, 27 bear, assuming the position represented at the right hand side of Fig. 2. The pressure is then also transmitted to the bar 24, which is connected by springs with the vehicle frame in the usual manner.

The coupling link 8 is jointed to the bar 2ᵃ by means of a horizontal pin 35, which permits it to yield slightly in a vertical plane. In order to obviate any danger of the coupling parts being displaced by shocks of the two vehicles the arms 17 may be held in the two extreme positions by means of springs. To this end a cam 36 is or may be provided on the shaft 16, against which the bottom of a cylinder 37 is pressed by the intermediary of a spring 38. By means of this cam 36 and the compressed spring 38 the arm 17 is maintained in the two extreme horizontal positions.

44, 44ᵃ, indicate projections on the draw bars 2, 2ᵃ, for engagement by the arm 20 and by a similar arm on the shaft 16, when the couplings are swung outward on the pivots 25, 25ᵃ to allow the coupling of two vehicles one of which is not provided with the improved coupling above described.

We do not claim herein the above described draw bar devices, the same being the subject of our pending application Serial No. 374,445, filed May 18, 1907, which is a division hereof, and being herein shown for a better understanding of the preferred means of supporting the coupling.

Having now particularly described and ascertained the nature of our said invention and in what manner the same is to be performed, we declare that what we claim is:

1. In a railway coupling, the combination of the two pairs of hook and link members, each hook member having an upper and lower hook pivotally mounted on a horizontal transverse axis, and each link member having an upper and lower transverse bar, the hooks being adapted to enter within the opposing link member, each upper hook having an upwardly turned extremity to engage under the upper transverse bar and each lower hook having a downwardly turned extremity to engage over the lower transverse bar, substantially as set forth.

2. In a railway coupling, the combination of two pairs of hook and link members, the hook member carrying pivoted hooks; and a longitudinally movable sleeve acting to engage and confine together the rear parts of both of the hooks of each pair when they are in engagement with the opposing link member, substantially as set forth.

3. In a railway coupling, the combination of two pairs of hook and link members, pivoted hooks carried by the hook member, rearward projections on the said hooks, a longitudinally movable sleeve acting to confine the said projections when the hooks are engaged with the opposing link member, and a transversely movable lock acting to oppose the movement of the sleeve when the hooks are disengaged, the lock being arranged to be engaged and moved to releasing position by a part of one of the hooks, substantially as set forth.

4. In a railway coupling, the combination of two pairs of hook and link members, pivoted hooks carried by the hook member, rearward projections on the said hooks, a longitudinally movable sleeve for confining the said projections, and a transverse rock shaft having arms for engaging parts of the said sleeve, substantially as set forth.

In witness whereof, we have hereunto signed our names in the presence of two subscribing witnesses.

NICOLA PAVIA.
GIACOMO CASALIS.

Witnesses:
NARIO CAPUCEIO,
GOTTARDO C. PIRONI.